(12) United States Patent
Bellis et al.

(10) Patent No.: US 9,316,337 B2
(45) Date of Patent: Apr. 19, 2016

(54) COVER FOR PIPE CONNECTION

(71) Applicant: Image Technology, Inc., Savannah, TN (US)

(72) Inventors: Johnny Bellis, Savannah, TN (US); Donald Hedge, Zackary, TN (US); Jay Porter, Dale, IN (US); Chris Klem, Dale, IN (US); Kerry Snyder, Dale, IN (US); Francis Hirt, Dale, IN (US); Branden Horne, Dale, IN (US)

( * ) Notice: Subject to any disclaimer, the term of this patent is extended or adjusted under 35 U.S.C. 154(b) by 0 days.

(21) Appl. No.: 14/077,553

(22) Filed: Nov. 12, 2013

(65) Prior Publication Data
US 2014/0131991 A1 May 15, 2014

Related U.S. Application Data

(60) Provisional application No. 61/725,508, filed on Nov. 13, 2012.

(51) Int. Cl.
*F16L 55/07* (2006.01)
*F16L 35/00* (2006.01)
*F16L 23/00* (2006.01)

(52) U.S. Cl.
CPC ............. *F16L 55/07* (2013.01); *F16L 23/003* (2013.01); *F16L 35/00* (2013.01); *F16L 2201/20* (2013.01); *F16L 2201/30* (2013.01)

(58) Field of Classification Search
CPC .......... F16L 21/06; F16L 57/005; F16L 35/00
USPC .......... 285/45, 55, 13, 14, 411, 373, 419, 197
See application file for complete search history.

(56) References Cited

U.S. PATENT DOCUMENTS

| | | | | | |
|---|---|---|---|---|---|
| 2,699,960 | A | * | 1/1955 | Callery et al. | 285/13 |
| 2,908,744 | A | * | 10/1959 | Bollmeier | 285/419 |
| 3,456,965 | A | * | 7/1969 | Harrison et al. | 285/419 |
| 3,711,633 | A | * | 1/1973 | Ghirardi et al. | 174/135 |
| 3,891,150 | A | * | 6/1975 | Hoff et al. | 285/197 |
| 4,018,979 | A | * | 4/1977 | Young | 285/373 |
| 4,043,333 | A | * | 8/1977 | Munsch | 285/197 |
| 4,441,694 | A | * | 4/1984 | Curran et al. | 285/45 |
| 4,452,097 | A | * | 6/1984 | Sunkel | 285/419 |
| 4,830,060 | A | * | 5/1989 | Botsolas | 285/45 |
| 5,015,013 | A | * | 5/1991 | Nadin | 285/419 |
| 5,092,631 | A | * | 3/1992 | Masnik et al. | 285/419 |
| 5,095,564 | A | * | 3/1992 | Kruger | 285/197 |
| 5,158,114 | A | * | 10/1992 | Botsolas | 137/375 |
| 5,266,740 | A | * | 11/1993 | Hsu | 285/45 |
| 5,312,137 | A | * | 5/1994 | Nee | 285/14 |
| 5,348,044 | A | * | 9/1994 | Eugene et al. | 137/312 |
| 5,489,124 | A | * | 2/1996 | Nee et al. | 285/14 |
| 6,164,345 | A | * | 12/2000 | Haddox | 137/312 |
| 6,244,290 | B1 | * | 6/2001 | Reicin et al. | 137/312 |
| 6,311,734 | B1 | * | 11/2001 | Petrovic | 285/45 |
| 6,767,033 | B2 | * | 7/2004 | King et al. | 285/197 |
| 6,881,901 | B2 | * | 4/2005 | Egan | 174/665 |
| 7,357,144 | B2 | * | 4/2008 | Im et al. | 137/312 |
| 7,628,428 | B2 | * | 12/2009 | Rampton et al. | 285/45 |
| 8,272,670 | B2 | * | 9/2012 | Krug et al. | 285/45 |
| 8,439,060 | B1 | * | 5/2013 | Jackson | 285/13 |
| 8,851,099 | B2 | * | 10/2014 | DeGeorge et al. | 137/312 |

* cited by examiner

*Primary Examiner* — David E Bochna
(74) *Attorney, Agent, or Firm* — Carlson, Gaskey & Olds, PC

(57) ABSTRACT

A shroud for a pipe connection includes first and second clamshell halves, a flexible hinge between the first and second halves, a snap connection connecting the first and second halves and a drip tube extending from one of the first and second halves. A pipe connection including the shroud is also disclosed.

13 Claims, 1 Drawing Sheet

COVER FOR PIPE CONNECTION

CROSS REFERENCE TO RELATED APPLICATIONS

This application claims priority to U.S. Provisional Application Ser. No. 61/725,508 filed Nov. 13, 2012.

BACKGROUND

This application relates to a cover for a pipe connection.

Pipe connections may be used in the oil transport industry. Oil must be communicated from one pipe to another. Typically, the pipes connect to each other at a bolted flange face. The connection between flanges is subject to leakage, and may sometimes leak, spray, or drip fluids. In some pipe connections, patches may be wrapped around the connection. The patches may be made of a cloth material that absorbs the leaked fluid. However, once the patches become saturated, the patches themselves may leak.

SUMMARY

DETAILED DESCRIPTION

Figure 1:
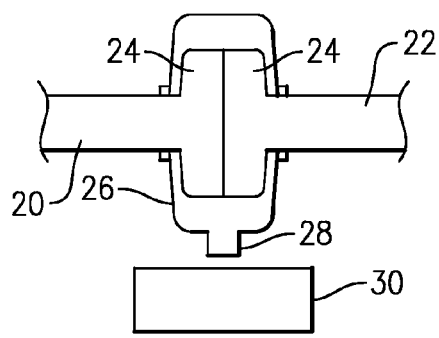
FIG. 1 schematically illustrates a pipe connection with a shroud.

FIG. 1 shows first and second pipes 20, 22 have flanges 24 which are in abutting contact with one another. However, it should be understood that the problems and solutions discussed below may also extent to a valve or other type of connection that may leak. The connection between the flanges 24 is subject to leakage. A shroud 26 may surround the connection between the flanges 24, and has a drip tube 28 that will divert any leaked fluid into a drip pan 30.

Figure 2:
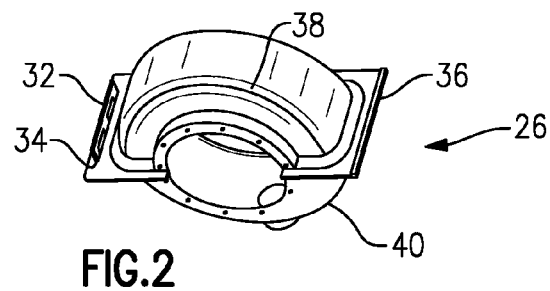
FIG. 2 illustrates the shroud of FIG. 1 in a closed position.
Figure 4:
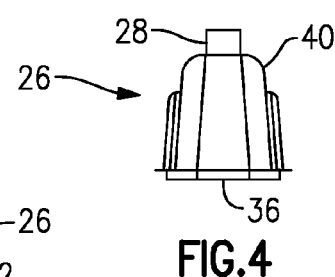
FIG. 4 illustrates a partial side view of the shroud of FIGS. 1-3B.
Figure 3A:
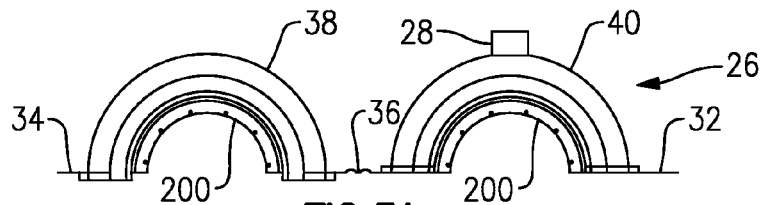
FIG. 3A illustrates a side view of the shroud of FIGS. 1-2 in an open position.
Figure 6:
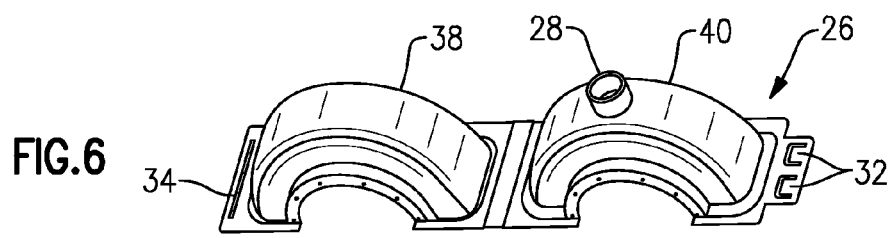
FIG. 6 illustrates an alternate perspective view of the shroud of FIGS. 1-5.
Figure 3B:
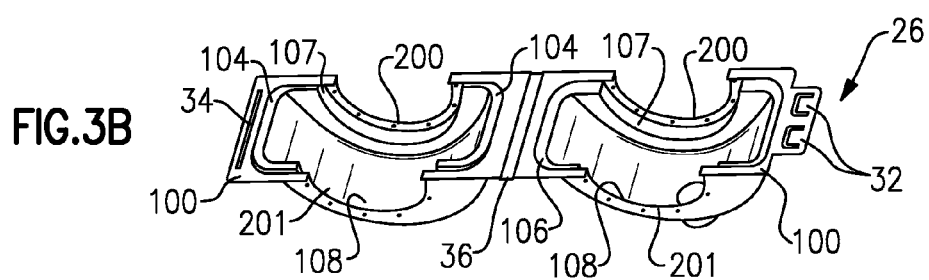
FIG. 3B illustrates a perspective view of the shroud of FIGS. 1-3A in the open position.
Figure 5:
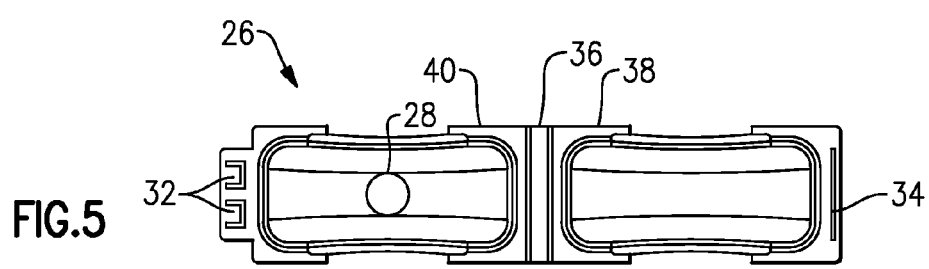
FIG. 5 illustrates an interior of the shroud of FIGS. 1-4 in the open position.

FIG. 2 shows a perspective view of the shroud 26 in the closed position. As shown, a pair of clamshell halves 38 and 40 are secured together with a snap connection by fingers 32 snapping through a slot 34. A flexible hinge 36 connects the clamshell halves 38, 40. The clamshell halves 38, 40 are symmetrical and arcuate such that when in the closed position, the shroud 26 is annular.

The shroud 26 may be made of an appropriate plastic, which may be polyethylene. In particular, high density polyethylene (HDPE) may be used. The shroud 26 may be formed by vacuum forming, blow molding, hydroforming, or injection molding.

As shown in FIGS. 3A-6, the clamshell halves 28, 40 can pivot away from each other, bending at the flexible hinge 36. Referring to FIG. 3B, there is a rib 104 on one of the halves 38 that fits into a ditch 106 on the other half 40. There are planar surfaces 100 extending outwardly from the first and second halves 38, 40 that provide a relatively large contact surface when the shroud 26 is in the closed position. In one example, the fingers 32 and the slot 34 are arranged on the planar surfaces 100. As is clear, the fingers 32 and slot 34 are positioned on an opposed side of the rib 104 and ditch 106 relative to arcuate openings 200.

Each of the clamshell halves 38, 40 have first and second arcuate openings 200, 201 on opposing sides of the halves 38, 40 which receive the pipes 20, 22 when the shroud 26 is in the closed position. A first flexible seal surface 107 on the interior of the shroud 26 is located along the arcuate openings 200 on one side each of the clamshell halves 38, 40, and a second flexible seal surface 108 is located along the arcuate openings 201 on the opposed side of the halves 38, 40. The flexible seal surfaces 107, 108 will conform and seal on the outer shape of the pipes 20, 22.

The inventive shroud 26 will be more durable and longer lasting than cloth patches. Further, it will provide more efficient capture of any leaked fluid, as it will not become saturated.

Although an embodiment of this disclosure has been explained, a worker of ordinary skill in this art would recognize that certain modifications would come within the spirit and scope of this invention. For that reason, the following claims should be studied to determine the true scope and content of this invention.

The invention claimed is:

1. A shroud for a fluid connection, comprising:
   first and second clamshell halves;
   a flexible hinge between the first and second halves;
   a snap connection connecting the first and second halves;
   a drip tube extending from one of the first and second halves;
   wherein the snap connection includes first and second fingers on one of the first and second halves configured to snap through a slot on the other of the first and second halves;
   wherein one of the first and second halves includes a rib, the rib configured to fit into a ditch on the other of the first and second halves; and
   wherein each of said first and second clam shell halves having an arcuate central opening and said fingers and said slot are positioned on an opposed side of the rib or the ditch relative to the central opening;
   a planar surface extending from each of the first and second halves, the planar surfaces providing a contact surface;
   wherein the snap connection is arranged on the planar surfaces.

2. The shroud of claim 1, wherein the first and second halves define a central opening configured to receive a valve.

3. The shroud of claim 1, wherein the central opening is defined by first and second arcuate openings on first and second opposed sides, respectively, of each of the first and second halves.

4. The shroud of claim 3, further comprising sealing surfaces on the interior of the shroud along each of the arcuate surfaces.

5. The shroud of claim 1, wherein the shroud is made from a plastic.

6. The shroud of claim 5, wherein the plastic is high density polyethylene.

7. The shroud of claim 5, wherein the shroud is formed by vacuum forming, blow molding, hydroforming, or injection molding.

8. A pipe connection, comprising:
   first and second pipes;
   first and second flanges on each of the first and second pipes, the flanges arranged in an abutting connection;

a shroud covering the connection, the shroud including first and second clamshell halves and a drain pipe;

a drip pain configured to receive fluid from the drain pipe;

wherein the shroud includes a snap connection, and the snap connection includes first and second fingers on one of the first and second halves configured to snap through a slot on the other of the first and second halves;

wherein one of the first and second halves includes a rib, the rib configured to fit into a ditch on the other of the first and second halves; and wherein each of said first and second clam shell halves having an arcuate central opening and said fingers and said slot are positioned on an opposed side of the rib or the ditch relative to the central opening.

9. The pipe connection of claim 8, further comprising a planar surface extending from each of the first and second halves, the planar surfaces providing a contact surface.

10. The pipe connection of claim 8, wherein the shroud is made from high density polyethylene.

11. The pipe connection of claim 8, wherein the shroud includes a central opening defined by first and second arcuate openings on first and second opposed sides, respectively, of each of the first and second halves, the central opening receiving the connection.

12. The pipe connection of claim 11, wherein the shroud includes sealing surfaces on the interior of the shroud along each of the arcuate surfaces.

13. The pipe connection of claim 12, wherein the sealing surfaces conform and seal to outer surfaces of the first and second pipes.

* * * * *